United States Patent
Spears

[19]

[11] Patent Number: 6,148,928
[45] Date of Patent: Nov. 21, 2000

[54] SYSTEM FOR MOUNTING A THREE POINT HITCH TO A PICK UP TRUCK

[76] Inventor: Lonnie K. Spears, 212 Willow Creek Cir., Allen, Tex. 75002

[21] Appl. No.: 09/293,691

[22] Filed: Apr. 16, 1999

[51] Int. Cl.⁷ .................................................. A01B 59/043
[52] U.S. Cl. .................... 172/439; 280/417.1; 280/416.1
[58] Field of Search ..................... 172/439, 440, 172/441, 443, 450, 451, 677, 679, 681, 684.5; 280/415.1, 416.1, 416.2, 417.1

[56] References Cited

U.S. PATENT DOCUMENTS

| | | | |
|---|---|---|---|
| 3,698,740 | 10/1972 | Chisholm et al. | 280/417.1 X |
| 3,883,020 | 5/1975 | Dehn . | |
| 3,955,831 | 5/1976 | Whitchurch | 280/456.1 X |
| 3,993,325 | 11/1976 | Gravett | 280/415 B |
| 4,090,624 | 5/1978 | Krein et al. | 172/501 |
| 4,940,096 | 7/1990 | Johson . | |
| 5,150,999 | 9/1992 | Dugan | 414/24.5 |
| 5,324,061 | 6/1994 | Lay | 280/417.1 |
| 5,423,394 | 6/1995 | Kendle | 172/439 X |
| 5,690,182 | 11/1997 | Ward | 280/416.2 X |
| 5,788,257 | 8/1998 | Meyerhofer | 280/416.1 |
| 5,797,614 | 8/1998 | Hord et al. | 280/417.1 |

OTHER PUBLICATIONS

Bigham Brothers Inc., "Three Point Hitches (Parts Breakdown)", published on the Internet at http://www.bighambrothers.com/hitch3p.htm, Mar. 10, 1999.

*Primary Examiner*—Victor Batson
*Attorney, Agent, or Firm*—Robert H. Frantz

[57] ABSTRACT

The three point hitch mounting system allows a pick up truck to be fitted with a three point hitch so that the pick up truck can be used to transport and operate common agricultural and industrial implements such as mowers, plows, and tillers. In enhanced embodiments, the mounting system provides for a stand that allows the hitch to stand freely when not mounted on a truck, a lift device to allow control of the depth and height of the implement, and a power source and power takeoff ("PTO") for driving powered implements, such as a mower.

13 Claims, 9 Drawing Sheets

SYSTEM FOR MOUNTING A THREE POINT HITCH TO A PICK UP TRUCK

TECHNICAL FIELD OF THE INVENTION

This invention relates to three point hitches for attaching agricultural and industrial implements to vehicles, and especially to pick up trucks. Three point hitches are commonly found on tractors for the connection to and operation of implements such as plows, mowers, and tillers.

CROSS-REFERENCE TO RELATED APPLICATIONS

Not applicable.

FEDERALLY SPONSORED RESEARCH AND DEVELOPMENT STATEMENT

This invention was not developed in conjunction with any Federally sponsored contract.

MICROFICHE APPENDIX

Not applicable.

BACKGROUND OF THE INVENTION

Three point hitches are well-known within the art for providing a method of interconnect and control between a vehicle, such as a tractor, and an implement, such as a plow, mower, or tiller. Three point hitches typically provide manual or automatic control of the level of the implement and the depth of the implement through a system of extendable arms and lifting mechanisms. A hitch such as this for a tractor was disclosed in U.S. Pat. No. 3,572,763, to Cannon, et al. The Cannon patent describes a variety of three point hitches which provide the ability to extend the two lower draft arms and to controllably extend the upper link of the hitch, thereby allowing ease of interconnect of the hitch to an implement, and providing lift and height control of the implement. This functionality is common among three point hitches found on tractors.

Another common function found on tractor-borne three point hitches is a power takeoff, or "PTO", which is a form of mechanical transmission that provides a power linkage between the tractor's engine and the implement. The PTO allows the implement to receive power for its operation, such as turning blades on a mower.

However, tractors are somewhat specialized vehicles and are not well suited for use on public roadways. If a farm implement dealer needs to deliver a new or repaired implement to a rural farm, it cannot be attached to a tractor and driven down a roadway conveniently. Also, if an empty field is to be mowed and the field is located in a suburban environment, a tractor with mower implement must be stored on a trailer and driven to and from the field using a pulling vehicle, such as a truck.

There are known within the art some very light duty "class zero" three point hitches available for various brands of four-wheel motorcycles. Because of the light weight of "four wheelers" and the relatively small engine output of these vehicles, they are not suitable for use of the larger, heavier duty class I, II, and III farm implements.

To solve one particular need for a three point hitch, the apparatus disclosed in U.S. Pat. No. 4,940,096 to Johnson, et al, provides a three point hitch mounted on a common pick up truck. The Johnson hitch system does provide some lift control, but does not provide a PTO means. Further, the Johnson hitch system requires permanent or semi-permanent modifications to the pick up truck in order to provide the stable mechanical mount to the vehicle, which further limits its use as it cannot be stored in a barn and quickly attached to any available pick up truck.

A more flexible system for mounting a variety of utility implements to the bed of a pick up is disclosed in U.S. Pat. No. 3,883,020 to Dehn. The Dehn system is especially well suited for bed-mounted implements, such as towing cranes or wrecker rigs, and dump beds. While the Dehn system provides quick and easy installation on a truck, it does not provide a three point hitch and is not suitable for adaption to a three point hitch.

Therefore, there exists a need in the art for a system and method for mounting a three point hitch to a pick up truck quickly and easily. The mounting apparatus should not require modifications to the standard pick up truck hardware, and should not require permanent or semi-permanent installation of the hitch system.

Further, there exists a need in the art for this three point hitch system to allow installation and removal of the hitch to and from the pick up truck by a single human operator.

Finally, there exists a need in the art for the three point hitch system to provide a power takeoff so that the hitch is useful with powered implements such as mowers.

SUMMARY OF THE INVENTION

The object of the present invention is to provide a three point hitch system which mounts temporarily and easily to a common pick up truck, without the need for modifications to the truck. The hitch system disclosed herein utilizes two common pick up truck mounting points, a square hitch receiver mounted on the truck frame just below the rear bumper, and a goose neck hitch mounted in the center of the truck bed above the rear axle of the truck.

Another object of the invention is to allow the hitch to be conveniently stored without the need for a special stand or holding frame, and to be installed and removed to and from a truck by a single operator. This will allow the hitch to be stored in a barn or shed while not in use, and then to be installed quickly to any available pickup truck, used for job, and then returned to the barn. This enables a farmer to own a few hitch systems, and to use them at will on a larger number of common pick up trucks, making the hitch system much more available and convenient than the sharing of a single or low number of utility tractors. It also allows pick up trucks to be used to transport farm implements over urban and suburban roadways using a pick up, for such tasks as delivery of new and repaired units to a rural farm.

Yet another object of the invention is to provide a power source and a power takeoff ("PTO") on the hitch system to allow powered implements, such as a mower, to be driven by the hitch system. This allows an operator to perform some operations using a pick up truck instead of a tractor, such as mowing a field. For example, combining the objects and features of the invention, a single pick up truck could be used to transport a mower over urban streets to an empty field, mow the field using the truck and hitch system as the power and propulsion vehicle, and returning the mower to a storage place without the need for a tractor or trailer, and saving the time of loading and unloading the tractor on the trailer.

BRIEF DESCRIPTION OF THE DRAWINGS

For a more complete understanding of the invention.

DETAILED DESCRIPTION OF THE INVENTION

Figure 1:
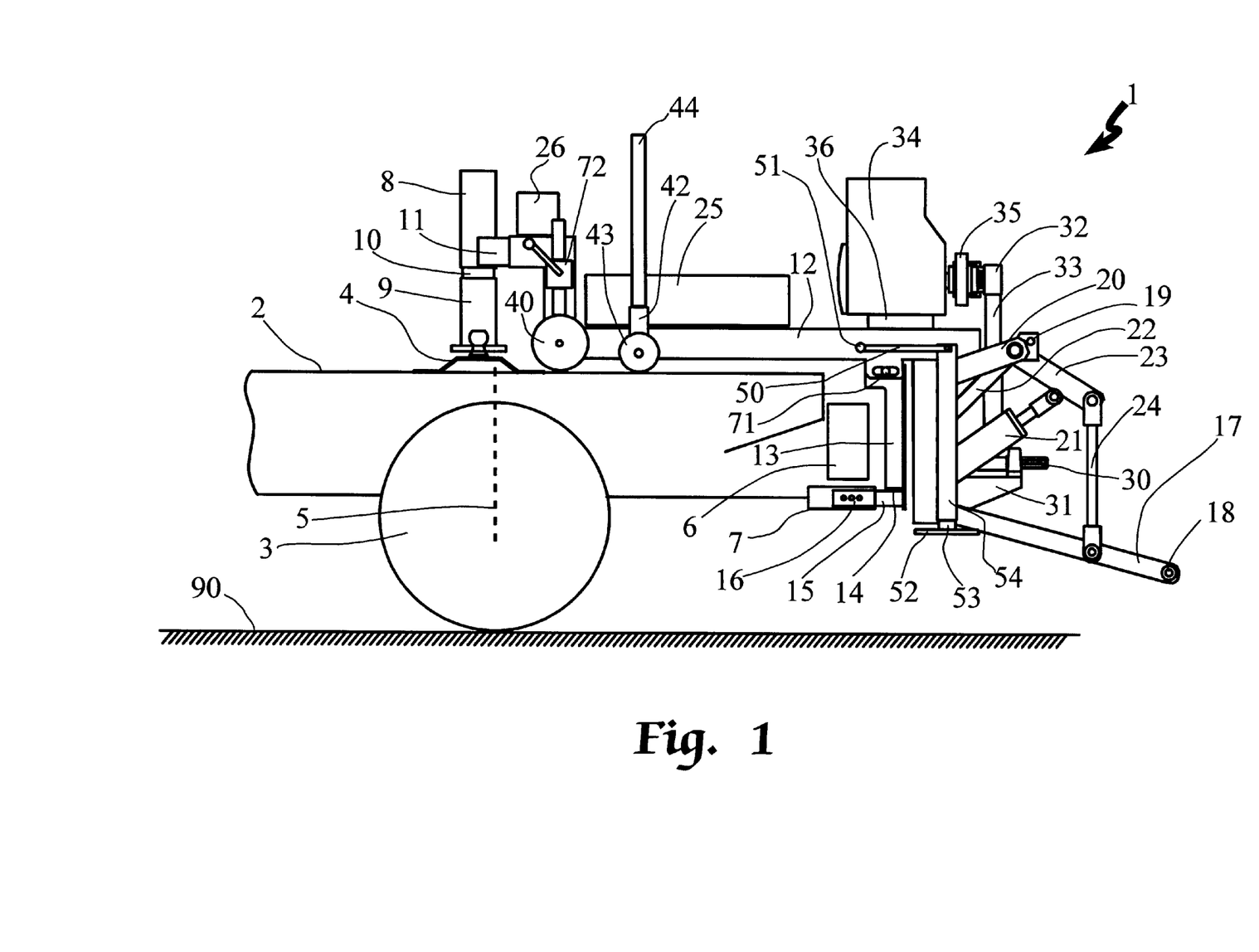
FIG. 1 shows a side view of the entire three point hitch system for pick up trucks, including its mounting points to the truck's gooseneck hitch and square receiver.

In accordance with the objects of the invention set forth in the Summary of the Invention, the three point hitch system (1) shown in FIG. 1 mounts to a typical pick up truck which is equipped with a gooseneck hitch (4) on the bed (2) of the truck, and the truck's square hitch receiver (7) mounted under the truck's rear bumper (6). The gooseneck hitch is preferably located slightly towards the front of the truck from a vertical axis (5) of alignment with the truck's rear wheel (3) axle, which distributes the weight of the hitch and implement forward of the rear axle. The entire truck and hitch system is suitable for use on a variety of terrains (90) such as pavement and inimproved earth.

Because the height from the gooseneck hitch to the square receiver depends on the particular model of pick up and model of the gooseneck hitch, the frame of the hitch system is provided with a vertical height adjustment in the vertical frame members which mount to the gooseneck hitch. The front vertical support assembly (8, 9, 10), which attaches over the gooseneck hitch (4), has an upper section (8) and a lower section (9) of approximately equal diameter and constructed of hollow steel tubes. A center slidable section (10) of slightly less diameter than the upper and lower sections fits inside the upper and lower sections, and may be retained by a number of temporary fastening means, such as bolts with wing nuts and/or cotter pins. The rear vertical support (13) has a square receiver insert (15) which slides into the truck's square hitch receiver tube (7), such as a 2-inch Class III or Class IV hitch receiver, and it is also fastened using a temporary fastening means (16) such as a hitch pin or bolt with a wing nut.

A frame spine (12) extends from the front vertical support (8, 9, 10) to the rear vertical support (13, 14, 15). At the front of the spine (12) is a length adjuster (11). The forward end of the length adjuster (11) is attached to the upper section (8) of the front vertical support, and slidably inserts into the spine (12), as shown in FIG. 1. The spine (12) is secured to the rear vertical support by a set of mounting ears and an attachment hitch pin (71). The mounting ears are described in further detail in the discussion of FIGS. 6 and 7 below. A hitch frame is suspended from the spine (12) and provides the mechanical framework on which the components of the three point hitch interconnect. The hitch frame is shown in more detail in FIGS. 6 and 7.

The three point hitch subsystem consists of the usual components necessary to attach the hitch to an implement, including two lower draft arms (17) which provide two of the three points of the hitch at the rear ends of the arms (18). A lifting means (21) is provided in order to control the height and depth of the implement. In the preferred embodiment, this is a hydraulic cylinder lift, powered by a battery (26) and electric motor and hydraulic pump (25), all mounted on the hitch spine (12) and controllable by the operator. In the preferred embodiment, the lifting means (21) is securely mounted on one end to the hitch frame, and on the other end to a set of lift members (23 and 24), which allow for the expansion and contraction of the hydraulic cylinder to be converted to lift force on the draft arms (17). An upper link support (20) is located on the hitch frame at a point suitable for the upper link connection (19), thereby providing the third point of the three point mechanism. The upper link support (20) may require some vertical reinforcement, such as the diagonal reinforcement member (22) shown in FIG. 1, depending on the gauge of steel stock used for constructing the frame and support members.

In order to provide power to certain types of implements, the preferred embodiment of the three point hitch system provides a motorized power takeoff ("PTO"). This is a refined embodiment of the system, and may not be required for all applications of the system. The PTO subsystem consists of a motor (34) mounted on the system frame using motor mounts (36) to allow for vibration of the motor during operation. In the preferred embodiment, this is a 25 horsepower internal combustion engine, commonly available in the art, and it is provided with local or remote operator controls. The motor output shaft is equipped with a clutch device (35), which in turn drives an upper belt pulley (32). Preferably, the clutch device is an electromechanical clutch which engages the upper belt pulley (32) under switch control by the operator. Other embodiments such as a centrifugal clutch, which engages when the motor speed reaches a certain rotational speed, or a mechanical clutch, could be used.

Figure 8:
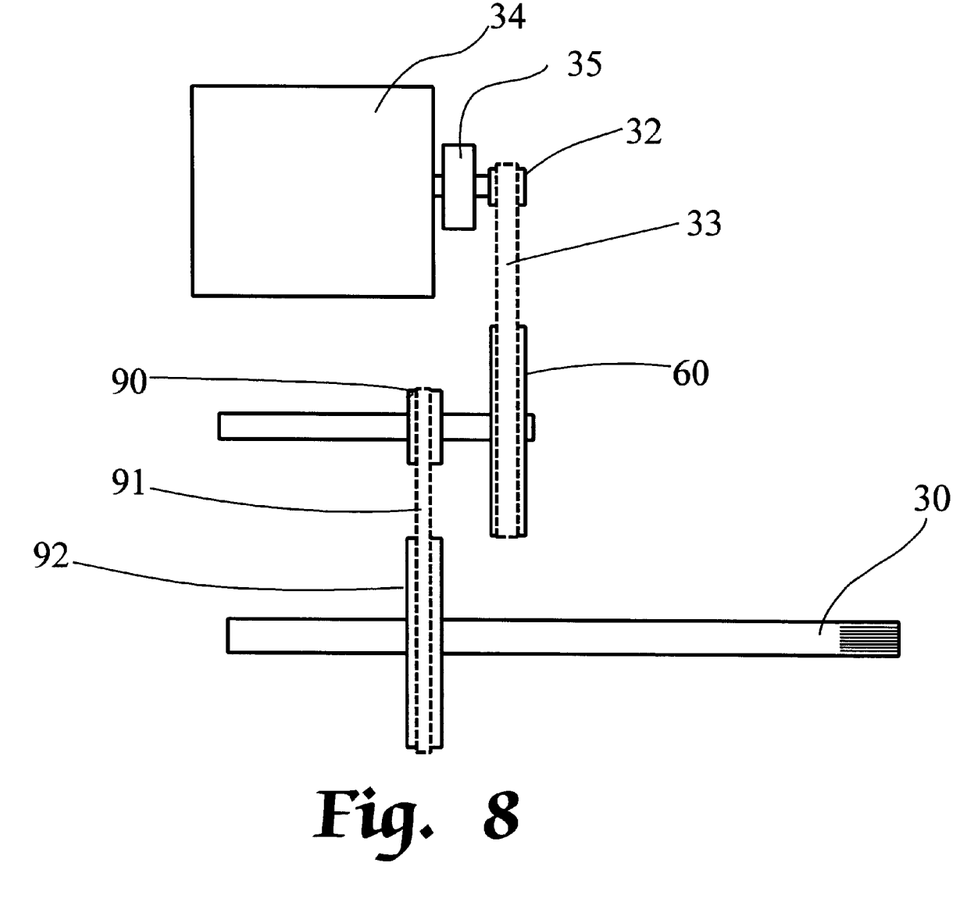
FIG. 8 is a schematic diagram of the drive train between the engine and the power takeoff.

A drive train is provided to transfer the motor's rotational energy from the motor's output shaft to the PTO. Pulley ratios used in the drive train reduce the motor's 3600 RPM output to an approximate 540 RPM at the PTO. FIG. 8 shows the drive train in detail, with an upper pulley (32) located directly on the output of the clutch (35). The lower belt pulley, located on the PTO drive shaft (30) is supported by a PTO support (31) which is affixed to the hitch frame. The drive train is preferably comprised of two belts, linked by a speed-reducing mid-pulley, shown in FIGS. 4 and 8, which are described infra. An alternate embodiment would use a hydraulic pump driven by the motor, with the hydraulic pressure from the pump being conducted from the pump's output to a hydraulic motor. The hydraulic motor would be located on the PTO shaft.

The mounting and stand subsystem is also a refinement in the preferred embodiment, and may not be necessary for cost reduced embodiments or embodiments intended for semipermanent mounting of the hitch system to a vehicle. The system is provided with a tripod stand system. The rear two points of the tripod consist of two lowerable feet (52) under control of a hand crank (50), similar to the front stand feet commonly found on tractor trailer trucks. An operator can rotate the hand crank (50) using a handle (51) to lower or raise the two feet (52), which causes a lower section of each leg (53) to retract into or telescope out of the upper sections (54) of each leg. This type of stand and hand crank are well known in the art. The third point of the tripod stand is a front leg (44) located near the front of the spine (12) as shown in FIG. 1. The front leg (44) slides vertically in a holder (42), and has a front leg wheel (43) at the lower end of it. When the hitch is to be removed from a truck, attachment hitch pin (71) is removed disconnecting the rear vertical support (13) from the retention ears of the spine (12). Then, the rear two feet (52) are lowered to the ground and rear end of the spine (12) is raised such that it is not resting on the rear vertical support (13). The front end of the spine (12) is then raised by operating the front jack (72), which lowers the front jack wheel (40) to the truck bed (2), causing the lower section (9) of the front vertical support be raised above and clear the gooseneck hitch (4). The truck can then be driven forward, with the front of the hitch system being supported by the front jack wheel (40) rolling on the truck bed (2), and the rear of the hitch system being supported by the rear two feet (52) on the ground (90). As the truck continues to move forward and out from under the hitch system, the front leg (44) will drop from the bumper (6) of the truck until its wheel (43) contacts the ground. The front leg holder (42) is provided with a latch which secures the leg from sliding back upwards through the holder, so that the front leg (44) will provide support for the front of the hitch system as the truck completely clears the hitch and the front jack wheel (40) is no longer in contact with the truck bed (2).

Figure 2:
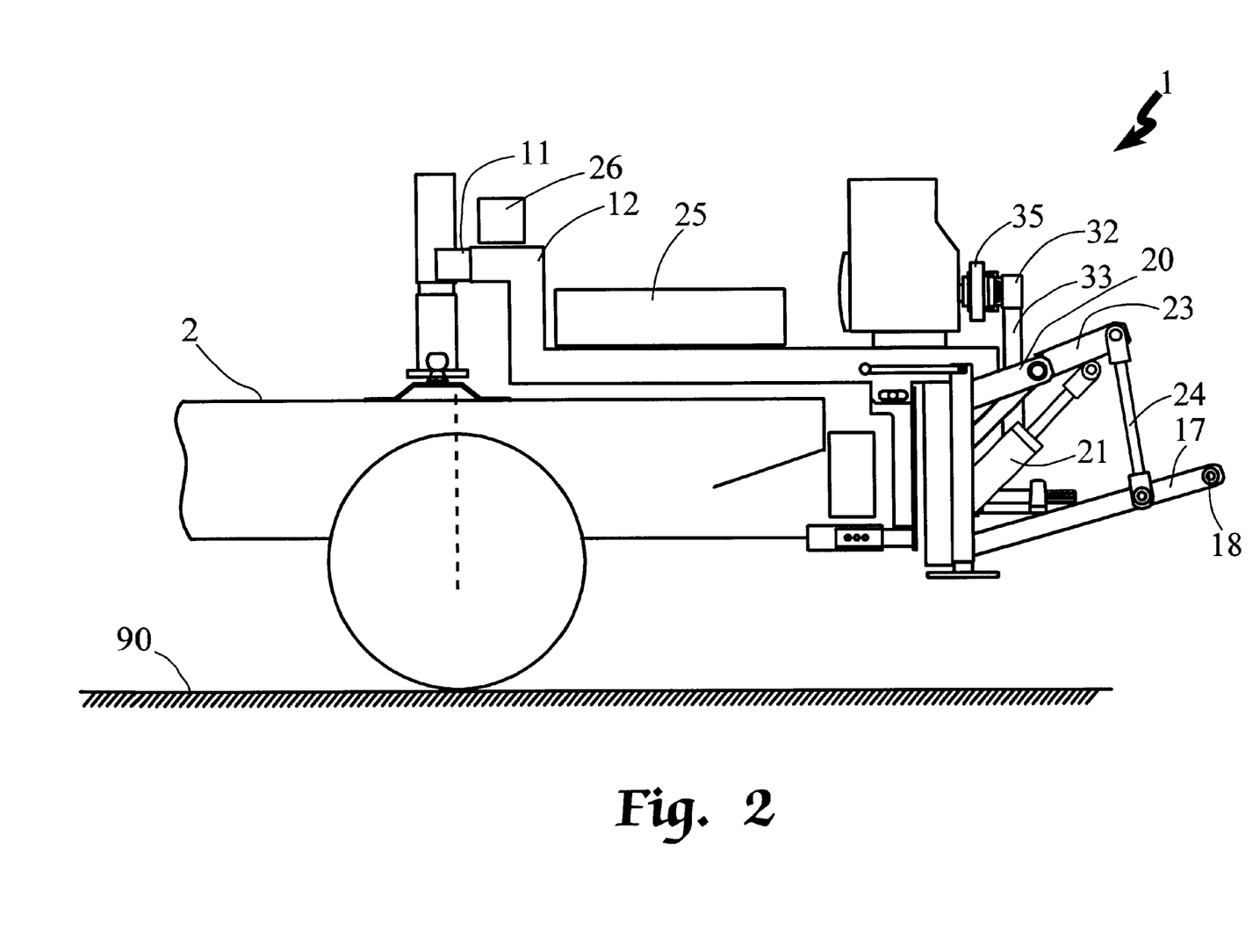
FIG. 2 shows the hitch system in a raised position.
Figure 3:
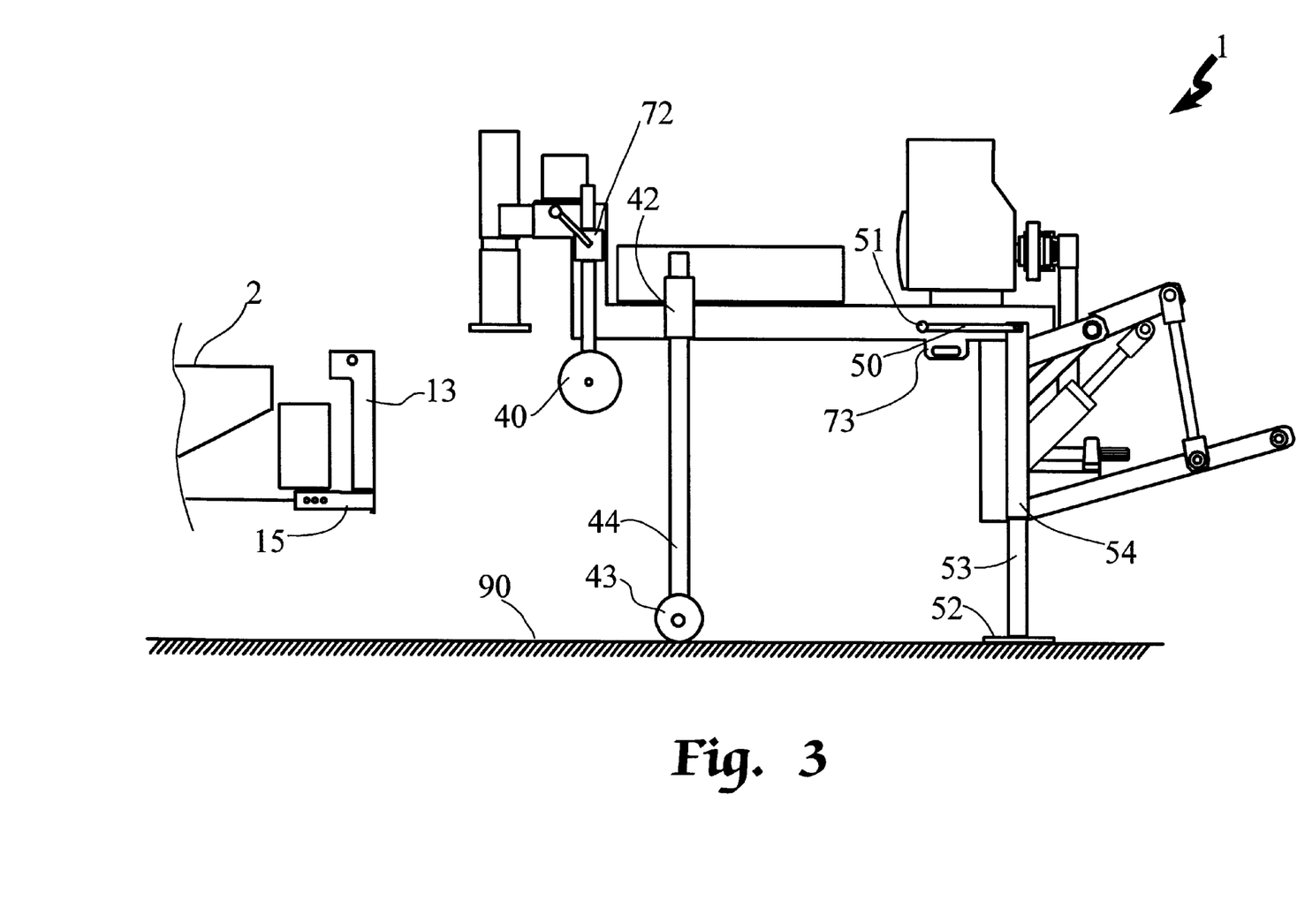
FIG. 3 shows the system in its free-standing mode on its tripod stand.

FIG. 2 shows the hitch system with the lower draft arms (17) in a raised position, caused by the extension of the lift means (21), and FIG. 3 shows the system in its free-standing mode with all three legs of the tripod stand lowered and the truck or vehicle removed.

Figure 4:
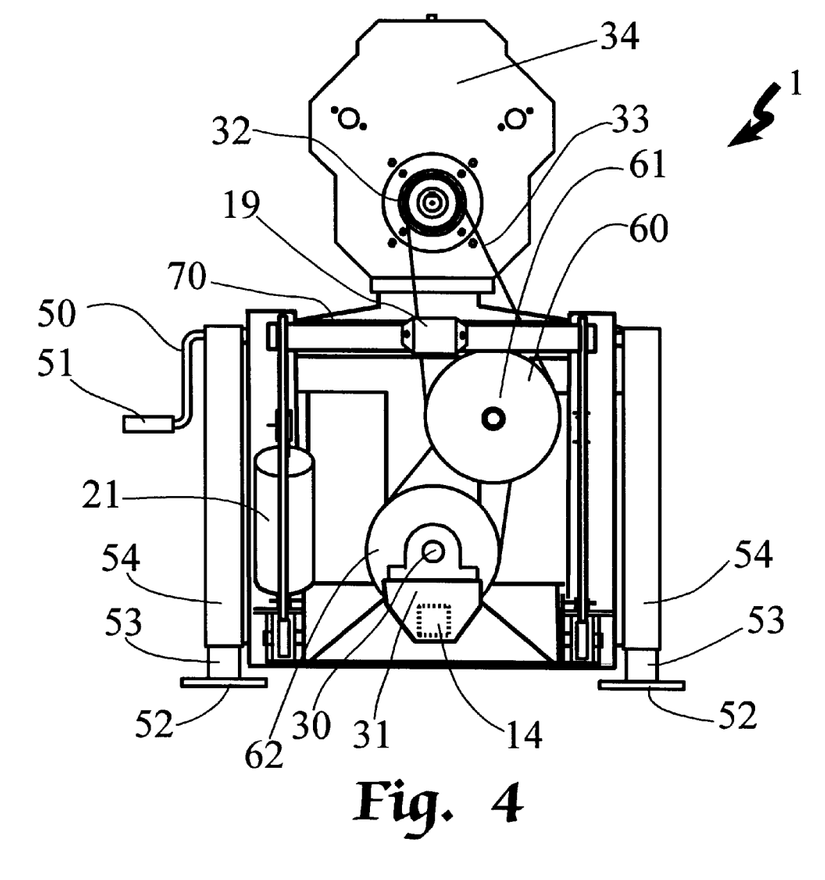
FIG. 4 provides a view of the hitch system from the rear of the vehicle, which allows a better view of the power takeoff belt system.

FIG. 4 provides a view of the lift system from the rear of the vehicle. Of particular interest in this view is the disclosure of the drive train, which consists of an upper belt pulley, and upper belt (33) to a mid-pulley (60), down through a lower belt to a pulley on the PTO shaft (30). The PTO shaft is supported by pillow blocks as shown. FIG. 8, described infra, shows a schematic of the drive train. The hidden attachment point to the square hitch receiver (14) is shown for reference. Also visible in FIG. 4 is the third point (19) on the three point hitch, which is located in the center of the coupling tube (70). The coupling tube (70), preferably constructed of 2¼ inch steel tube stock, provides interconnect between the two lift arms such that they raise and lower the draft arms together. The coupling tube (70) couples the left force from the side of the assembly equipped with the lift means to the side of the assembly without the lift means.

Figure 5:
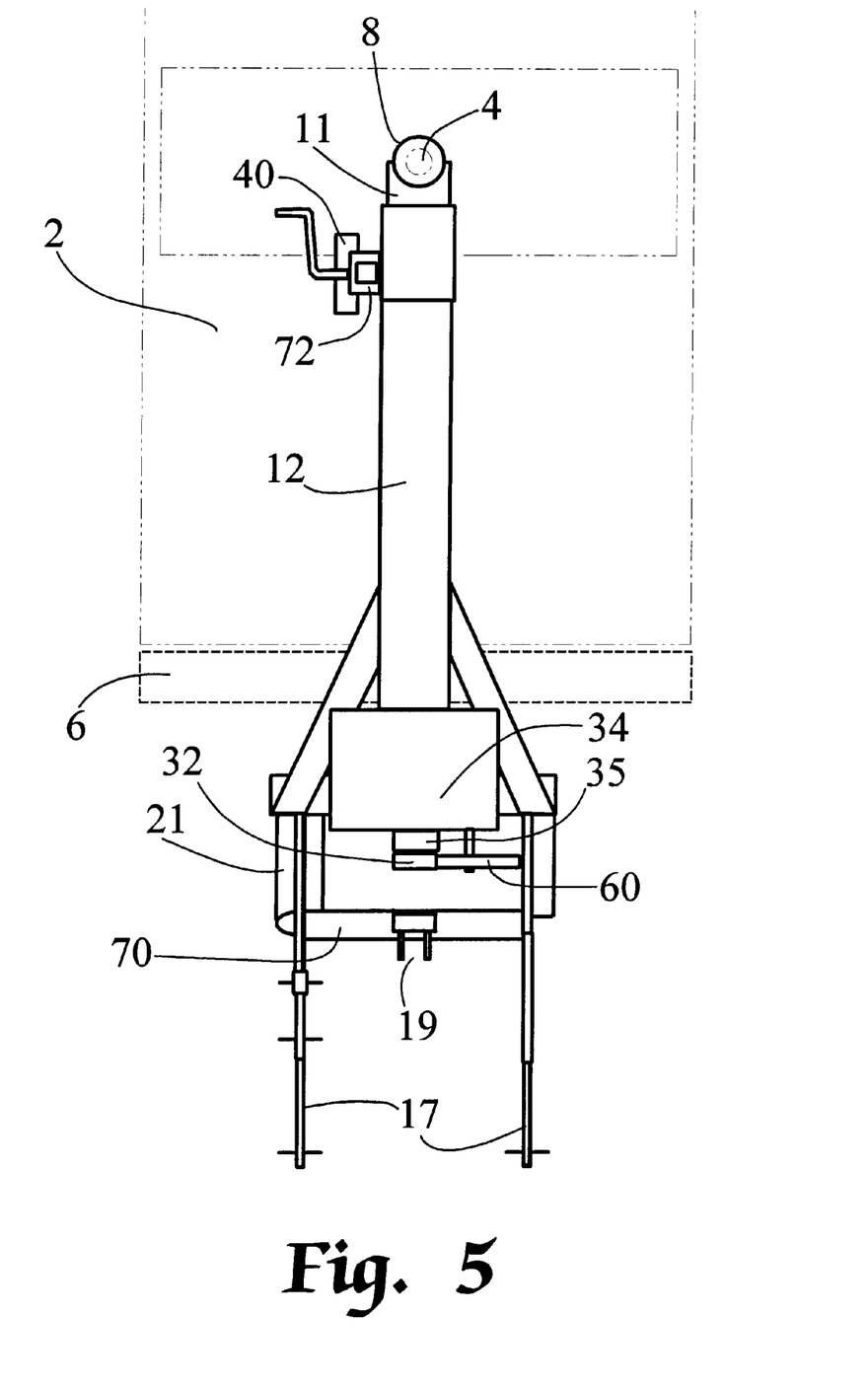
FIG. 5 discloses a top view of the hitch system.

FIG. 5 shows the top view of the hitch system mounted to a truck bed (2) and the gooseneck hitch (4) and bumper (6). The relationship of the front jack (72) and front jack wheel (40) can be seen in this view. Also given in FIG. 5 is the preferred method of reinforcing the lift system by using two diagonal members towards the rear of the system, extending from the spine (12) to the outer sides of the hitch frame.

Figure 6:
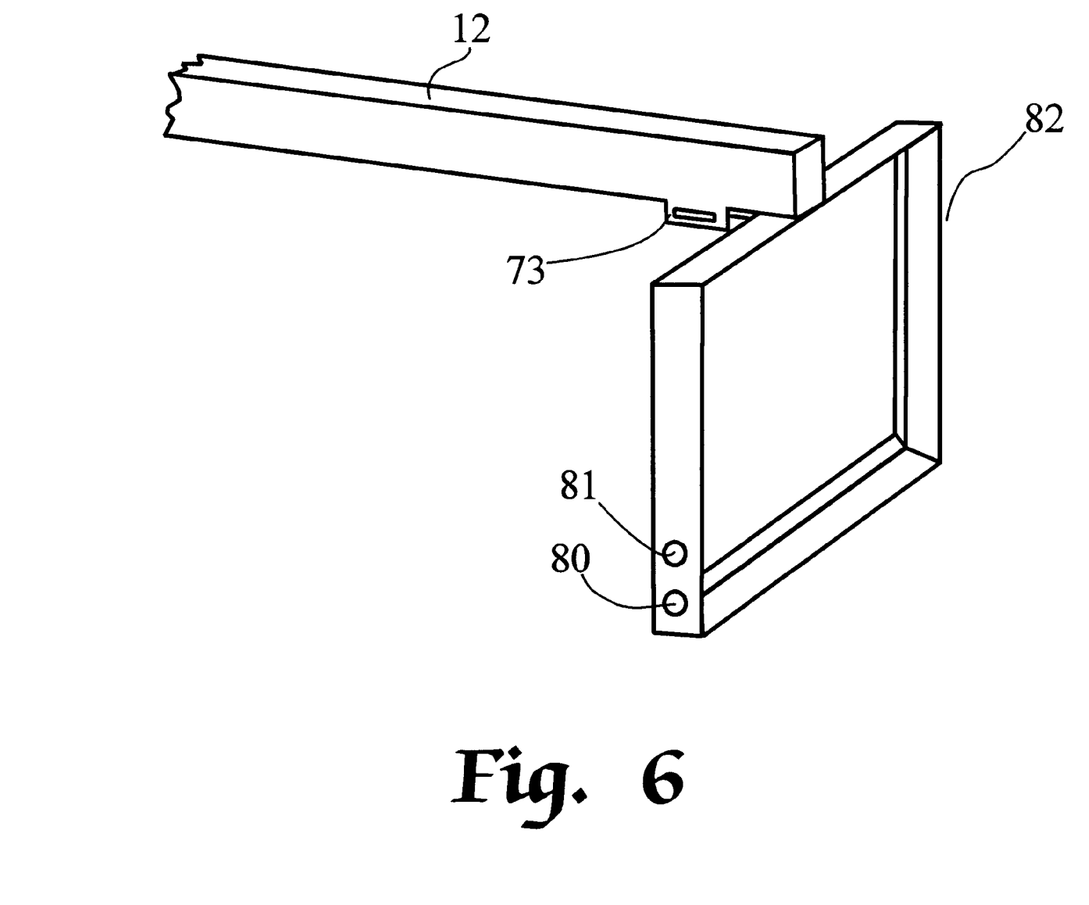
FIG. 6 shows the underlying frame of the hitch system.
Figure 7:
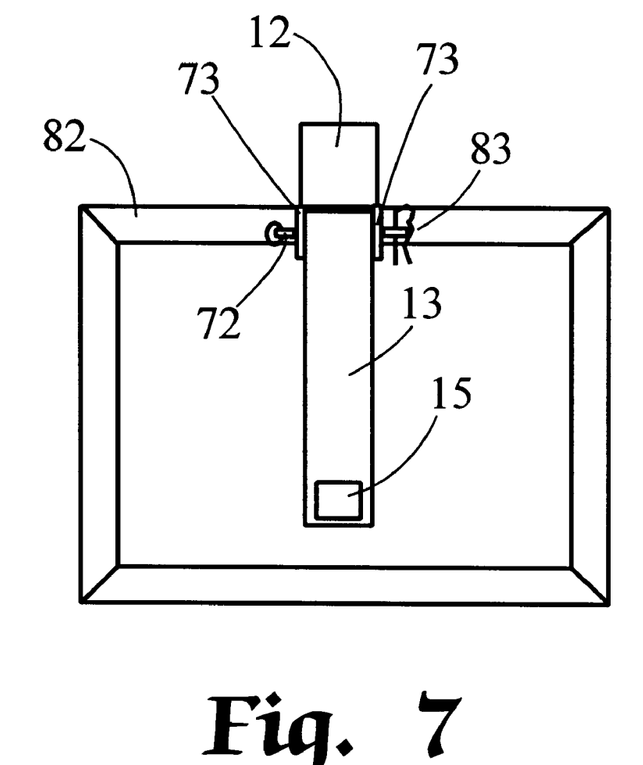
FIG. 7 shows a partial assembly view of the frame as viewed from the front of the system.

Turning now to FIG. 6, a simplified view of the underlying frame of the hitch system is shown. A hitch frame (82) is fabricated preferably of L-shaped angle iron welded to provide a square frame. Holes in the frame, such as the lower hole (80) and the upper hole (81), provide a point for a bolt or pin to secure the end of the draft arm and hydraulic lift cylinder. The spine (12) is preferably constructed from a length of square tubular steel stock, and welded to the top side of the hitch frame (82). Two slotted mounting ears (73) extend downward from the spine (12) near the interconnect of the spine (12) with the hitch frame (82). FIG. 7, a cut-away view of the simplified underlying frame is given from the front of the hitch system, it can be seen that the mounting ears (73) form an inverted saddle in which the upper end of the rear vertical support (13) rests. A pin (72) passes through the ears and holes in either side of the rear vertical support to hold the assembly together, and the pin is secured by a clip (83).

Finally, FIG. 8 shows a schematic of the power train, in which an upper pulley (32) drives an upper belt (33), and in turn drives a mid-pulley (60). The mid-pulley drives a smaller mid-pulley (90) through a mid-shaft (61). A lower belt (91) is driven by the smaller mid-pulley (90), and transfers power to the lower pulley (92), which is located on the PTO shaft.

Figure 9:
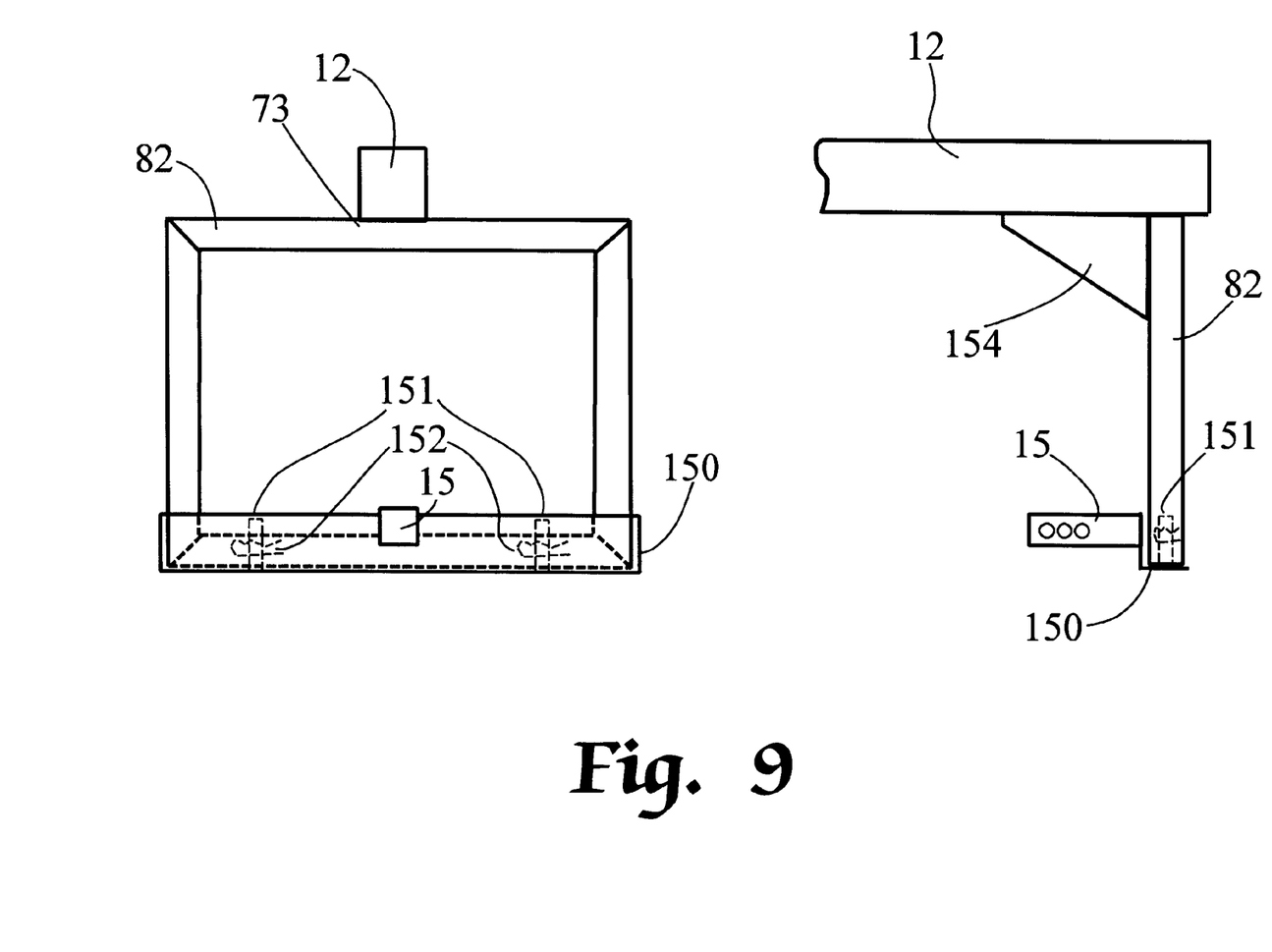
FIG. 9 shows an alternate mechanism for attaching the hitch system to the square hitch receiver on the truck.

FIG. 9 shows an alternate embodiment of the rear vertical support. In this embodiment, the square hitch receiver insert (15) is welded to a piece of angle iron stock to create a frame bottom support (150). The bottom side of the frame (82) rests on the frame bottom support (150), and is retained by pins (151) and cotter clips (152). Gussets (154) are preferably placed from the spine (12) to the frame (82) to provide additional structural support.

While the invention has been set forth in this disclosure with respect to the preferred embodiment, and in some cases optional embodiments have been set forth, it will be appreciated by those in the art that there are many ways to implement the structural design of the three point hitch system without departing from the spirit and scope of the invention and disclosure herein.

What is claimed is:

1. A mounting system for mounting a three point hitch to a pick up truck equipped with a bumper-mounted square hitch receiver and a gooseneck hitch, comprised of:

a front vertical support assembly, said front vertical support assembly having an upper end and a lower end, said lower end capable of fitting over the gooseneck hitch;

a rear vertical support assembly, said rear vertical support assembly having an insert member suitable for being received by the truck square hitch receiver;

a rigid spine disposed between said front vertical support member and said rear support member, said rigid spine having a front end and a rear end;

a hitch frame affixed to said rear end of said rigid spine, said hitch frame having a top side, a bottom side, a left side and a right side;

a left draft arm for the three point hitch capable of being attached to said left side of the hitch frame;

a right draft arm for the three point hitch capable of being attached to said right side of the hitch frame; and an upper link for the three point hitch disposed in a substantially central location along said top side of said hitch frame thereby enabling the three point hitch to be mounted to the pick up truck.

2. The three point hitch mounting system of claim 1, further comprising:

a retractable front vertical leg disposed substantially near the front end of said spine;

a lowerable left rear jack stand disposed on the left side of said hitch frame; and a lowerable right rear jack stand disposed on the right side of said hitch frame such that when said left rear jack stand, said right rear jack stand, and said front vertical leg are operated to their lowered positions the system stands freely on a surface.

3. The three point hitch mounting system of claim 2 wherein said retractable front vertical leg further comprises:

an upper front leg end;

a lower front leg end;

a leg roller wheel disposed on said lower front leg end; and a leg holder with latching means, said latching means allowing said retractable front leg to move to a lower position freely while restricting its movement upward such that as the leg roller wheel drops from a higher surface to a lower surface, said front vertical leg falls and latches to a lower position with the leg roller wheel contacting the lower surface.

4. The three point hitch mounting system of claim 1 further comprising a gooseneck release jack disposed on said spine substantially near said front vertical support assembly such that operating the gooseneck release jack raises the front vertical support assembly in order to release the mounting system from the gooseneck hitch, and such that lowering the gooseneck hitch jack allows the front vertical support to engage the gooseneck hitch.

5. The three point hitch mounting system of claim 4 wherein said gooseneck release jack further comprises:

an upper gooseneck release jack end;

a lower gooseneck release jack end; and a gooseneck release jack wheel disposed at said lower gooseneck release jack end for allowing the gooseneck release jack to provide support to the front end of the spine while the gooseneck release jack is in a lowered position and the gooseneck release jack wheel is contacting the truck.

6. The three point hitch mounting system of claim 1 further comprising;

a left lift arm having a left lift arm forward end and a left lift arm rear end, said left lift arm being pivotally attached to said left side of said hitch frame;

a right lift arm having a right lift arm forward end and a right lift arm rear end, said right lift arm being pivotally attached to said right side of said hitch frame;

a left lift linkage having a left lift linkage top end and a left lift linkage lower end, said left lift linkage being pivotally attached to said left lift arm rear end at said left lift linkage top end, and said left lift linkage also being pivotally attached to said left draft arm at said left linkage lower end;

a right lift linkage having a right lift linkage top end and a right lift linkage lower end, said right lift linkage being pivotally attached to said right lift arm rear end at said right lift linkage top end, and said right lift linkage also being pivotally attached to said right draft arm at said right lift linkage lower end;

a rigid lift coupling tube extending from said pivotal interconnect of said left lift arm and said hitch frame to said pivotal interconnect of the right lift arm and the hitch frame such that said left lift arm and said right lift arm raise and lower together; and a lift means for applying force to raise the right and left lift arms such that the right and left draft arms are also lifted.

7. The three point hitch mounting system of claim 6 wherein said lift means further comprises:

an electric power source;

an electric motor, receiving energy from said electric power source;

a hydraulic pump driven by said electric motor to pressurize hydraulic fluid; and a hydraulic cylinder receiving pressurized hydraulic fluid from said hydraulic pump, said hydraulic cylinder being disposed on said hitch frame so as to provide lift force to said left and right lift arms.

8. The three point hitch mounting system of claim 7 wherein said electric power source is a battery.

9. The three point hitch mounting system of claim 1, further comprising:

an internal combustion engine mounted substantially near the rear end of the spine, said engine having an output shaft;

a drive train having an input for receiving power from said internal combustion engine output shaft, and said drive train having a speed-reduced output;

a power takeoff shaft mounted centrally along said hitch frame bottom side and receiving power from said drive train speed-reduced output such that power from the internal combustion engine is transferred to the power takeoff shaft.

10. The three point hitch mounting system of claim 9 wherein said drive train further comprises an electromechanical clutch to allow selective engagement of the power takeoff while said internal combustion engine output shaft is turning.

11. The three point hitch mounting system of claim 9 wherein said drive train further comprises a mechanical clutch to allow selective engagement of the power takeoff shaft while said internal combustion engine output shaft is turning, said mechanical clutch being engaged when a mechanical control is actuated.

12. The three point hitch mounting system of claim 9 wherein said drive train further comprises a centrifugal clutch to allow automatic engagement of the power takeoff shaft while said internal combustion engine output shaft is turning, said centrifugal clutch engaging when said engine output shaft is turning at or above a certain rotational speed.

13. The three point hitch mounting system of claim 1, further comprising:

a internal combustion engine, said engine having an output shaft;

a hydraulic pump having an input for receiving power from said internal combustion engine output shaft, and said hydraulic pump having a pressurized hydraulic pump output;

a power takeoff shaft and hydraulic motor mounted centrally along said hitch frame bottom side, said hydraulic motor receiving power from said hydraulic pump output via a hydraulic hose such that power from the internal combustion engine is transferred to the power takeoff shaft.

* * * * *